United States Patent [19]

Singhal

[11] Patent Number: 5,407,149

[45] Date of Patent: Apr. 18, 1995

[54] DEVICES AND MEANS TO ENGAGE IN INDOOR FLIGHT OF RADIO CONTROLLED MODEL AIRCRAFTS

[76] Inventor: Tara C. Singhai, P.O. Box 5075, Torrance, Calif. 90510

[21] Appl. No.: 123,584

[22] Filed: Sep. 17, 1993

Related U.S. Application Data

[63] Continuation of Ser. No. 908,338, Jul. 6, 1992, abandoned, which is a continuation-in-part of Ser. No. 707,593, May 30, 1991, abandoned.

[51] Int. Cl.⁶ ............................................. G01M 9/00
[52] U.S. Cl. .................................. 244/1 R; 244/190; 73/147; 250/222.1
[58] Field of Search .................... 244/190, 1 R, 53 R, 244/58, 55, 49, 63; 343/34, 54; 250/221, 221.1; 73/147

[56] References Cited

U.S. PATENT DOCUMENTS

| | | | |
|---|---|---|---|
| 2,070,721 | 2/1937 | Feight | 244/63 |
| 2,355,948 | 2/1950 | Weiss | 244/114 R |
| 2,383,559 | 8/1945 | Parker | 244/63 |
| 2,473,893 | 6/1949 | Lyle | 250/222.1 |
| 2,497,427 | 8/1944 | Bonstow et al. | 244/114 R |
| 2,799,460 | 7/1957 | Hastings | 73/147 |
| 3,427,611 | 2/1969 | Enenstein | 342/54 |
| 4,157,544 | 6/1979 | Nichols | 342/34 |
| 4,415,133 | 11/1983 | Phillips | 244/55 |
| 4,457,509 | 7/1984 | St-Germain | 73/147 |
| 4,672,195 | 6/1987 | Golborne et al. | 250/222.1 |
| 4,700,912 | 10/1987 | Corbett | 244/63 |
| 4,706,907 | 11/1987 | Kopylov | 244/49 |
| 4,768,738 | 9/1988 | Weinert | 244/58 |
| 4,920,791 | 5/1990 | Griffin | 73/147 |
| 4,932,777 | 6/1990 | Fodale et al. | 73/147 |

OTHER PUBLICATIONS

Lovell et al., "Hovering-flight Tests of a Model of a Transport" NACA TN 3630, Mar., 1956.
"The Industrial Applications of Aerodynamic Tech" Natl Physial Lab. Notes on Applied Sci. 1952.

*Primary Examiner*—Galen L. Barefoot
*Attorney, Agent, or Firm*—Steven G. Roeder; Sheldon & Mak

[57] ABSTRACT

Devices and means to conduct indoor model aircraft flight, in an indoor/enclosed space using radio controlled model aircrafts. The aircraft is controlled by available multi channel radio control transmitter/receiver set and available micro size servo motors for control of aircraft surfaces and electric motor. The indoor/enclosed space is lighted, provide with upward air flow, marked by laser light beams and separated from public by transparent barrier to provide a controlled space for engaging in flight of model aircrafts.

29 Claims, 3 Drawing Sheets

DEVICES AND MEANS TO ENGAGE IN INDOOR FLIGHT OF RADIO CONTROLLED MODEL AIRCRAFTS

CROSS REFERENCE

This is a continuation of application Ser. No. 07/908,338, filed on Jul. 6, 1992, now abandoned, which was a continuation-in-part of application Ser. No. 07/707,593, filed on May 30, 1991, now abandoned.

BACKGROUND OF INVENTION

1. Field of Invention

Radio controlled model aircrafts are flown outdoors in a suitable location, that must have the prerequisites of: large open space away from houses and people, away from power transmission lines away from automobile traffic freeways, has upward air currents usually found near ocean cliffs. In addition if the remote radio control is lost or interrupted, the aircraft crashes resulting in damage or loss of the costly model aircraft. The flying of the model aircraft is limited by the weather considerations such as availability of wind of suitable direction and speed, absence of strong winds and rains or other weather considerations. In addition adequate daylight is necessary and flight of model aircrafts can only be engaged in daylight hours.

These requirements and restrictions for flying the model aircrafts severely limit the opportunities for peoples of all ages in engaging in flight of remote control model aircraft. The invention herein brings the flight of the radio controlled model aircraft indoors, eliminating all of the restrictions mentioned above.

2. Description of Related Art

There is prior art on wind tunnels which is used for testing aerodynamic forces and behavior on models. However this invention is unlike these prior art as it does not have any of the claimed features of a wind tunnel.

SUMMARY OF THE INVENTION

Provides means for indoor radio controlled model aircrafts flights using a flight space isolated from people. The flight space is supplied by upward air flow and is marked and delineated by visible light beam sources.

DESCRIPTION OF PREFERRED EMBODIMENT

Devices and means to conduct indoor model aircraft flight, in an indoor/enclosed space using radio controlled model aircrafts. The aircraft is controlled by available multi channel radio control transmitter/receiver set and available micro size servo motors for control of aircraft surfaces and electric motor.

Radio controlled model aircrafts are flown outdoors in a suitable location, that must have the prerequisites of: large open space away from houses and people, away from power transmission lines, away from automobile traffic freeways, has upward air currents usually found near ocean cliffs. In addition if the remote radio control is lost or interrupted, the aircraft crashes resulting in damage or loss of the costly model aircraft. The flying of the model aircraft is limited by the weather considerations such as availability of wind of suitable direction and speed, absence of strong winds and rains or other weather considerations. In addition adequate daylight is necessary and flight of model aircrafts can only be engaged in daylight hours.

These requirements and restrictions for flying the model aircrafts severely limit the opportunities for peoples of all ages in engaging in flight of remote control model aircraft. The invention herein brings the flight of the radio controlled model aircraft indoors, eliminating all of the restrictions mentioned above.

The indoor/enclosed space has walls, a floor, a ceiling with ventilation means and people entry and exit means. The space can be interior of any relatively large suitable structure such as a gymnasium, a geodesic dome, an aircraft hanger or an atrium of a shopping mall.

Figure 1:
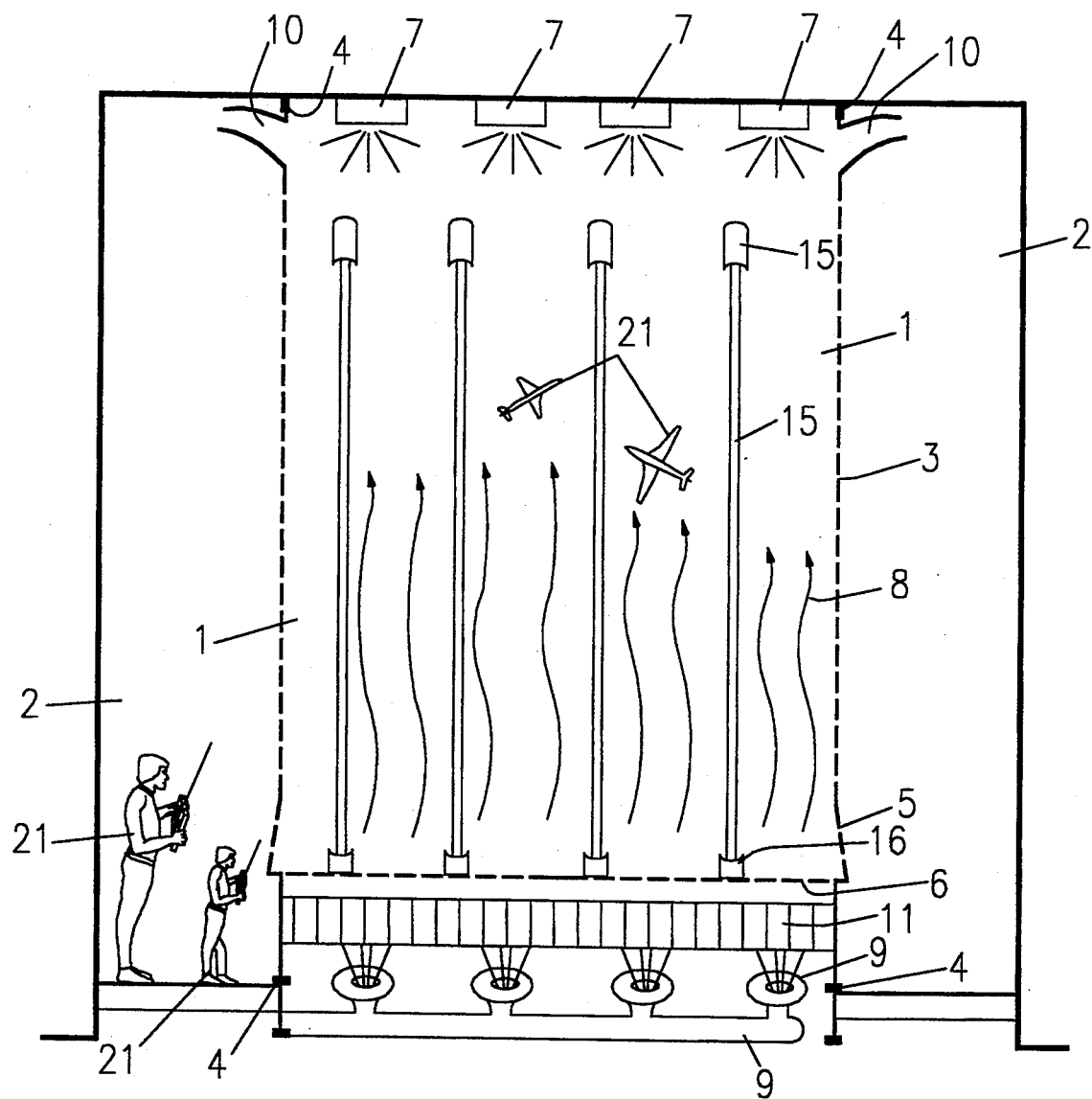
FIG. 1. Elevation view of indoor/enclosed space showing flight space and non-flight space.
Figure 2:
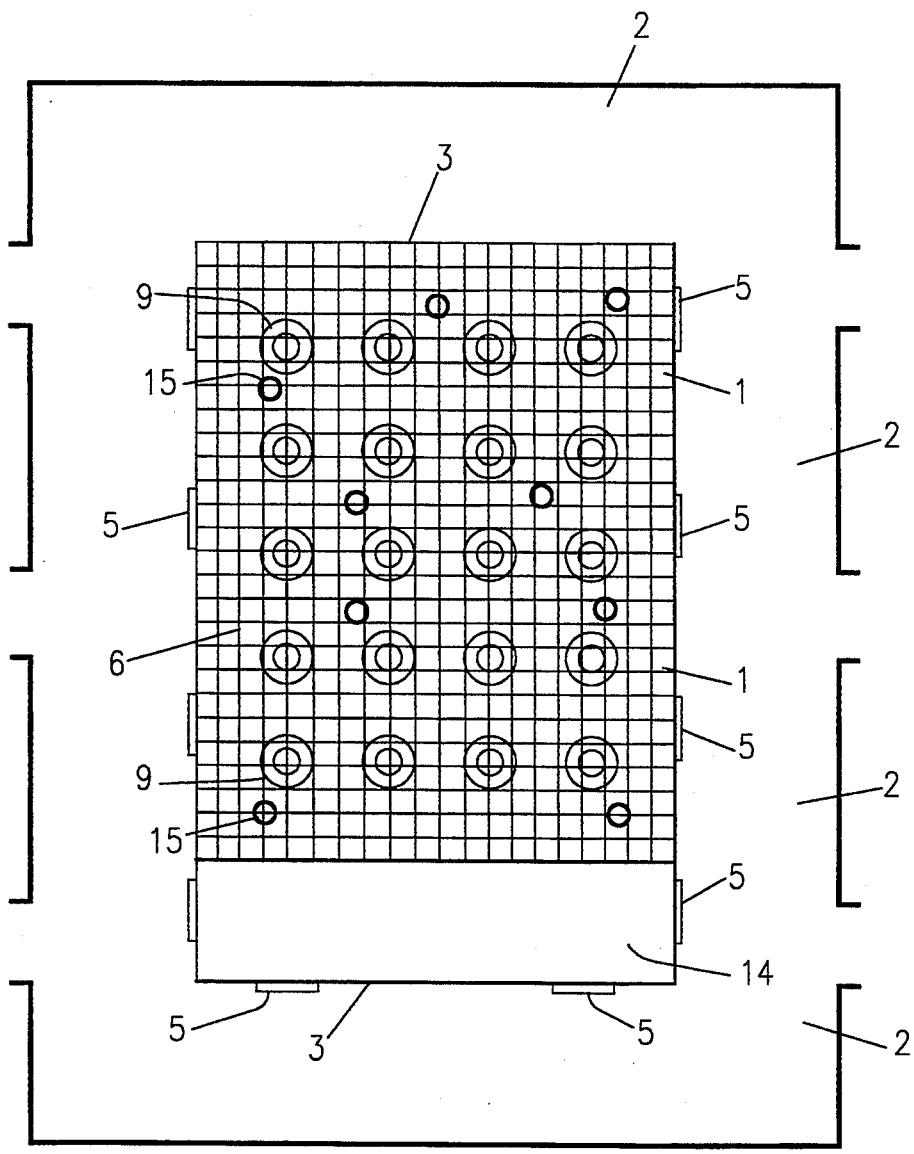
FIG. 2. Plan view of the indoor/enclosed space showing flight space and non-flight space.

Refer to FIGS. 1 and 2. The indoor/enclosed space is partitioned into a flight space (1) and a non flight space (2). This partioning is generally such that the flight space is in the center of the indoor space surrounded by non flight space around it. The flight space itself is enclosed on all sides by a transparent barrier in the form of nylon netting and thereby separated from the non-flight space (3). The transparent nylon netting barrier that surrounds the flight space is kept in place as it is tethered to the ceiling and anchored at the floor (4). The transparent nylon netting barrier isolates the flight space in which aircraft will be flown from the non-flight space and thus from the spectators and those participating in this activity.

The flight space has a barrier in the form of netting material at or near the bottom of flight space (6) to capture and retrieve aircraft that have gone astray without damage to the model aircraft.

The non-flight space is accessible to members of public and primarily used by them for engaging in and or witnessing the flight of model aircrafts inside the flight space. The non flight space is also used for other secondary purposes for supporting the model aircraft flight activity.

The indoor/enclosed structure's interior space and specifically the flight space is adequately lighted by high intensity lamps suitably placed to generate uniform lighting in the flight space (7).

The flight space has air flow and air current patterns (8) created by means of installing fans/compressor either in the indoor/enclosed space or outside of it, whose air flow is ducted to inside of the flight space and released at multiple outlets at suitable points under control for the purpose of creating air flow and air current patterns to provide lift for flight of model aircraft (9).

The flight space has gentle upward flowing air flow (8). The air flow patterns are similar to those found near sea cliffs. The air at or near the ceiling, after it has travelled up, is ventilated out of the flight space (10). When natural movement of air moving horizontally strikes a sea shore cliff, it rises upwards and such rising air is suitable for the purpose of providing lift to model aircraft. Depending upon the air flow intensity, model aircrafts weighing a few pounds without an engine can be flown. Model aircraft used in the flight space are smaller and lighter and are ones that weigh in the order of less than a pound.

There can be many means of generating the air flow suitable for this activity. One means of creating the upward air flow is by ducting the air flow to the bottom of interior of the flight space from outside and then uniformly spreading, and then releasing the said air flow at generally the bottom of the said flight space (9). Grates are placed that spread the upward air flow to occupy the total volume of the flight space (11). Fans can also be installed at the bottom that blow air upwards. Grating then would also be used to reduce turbulence of upward air flow.

Figure 3:
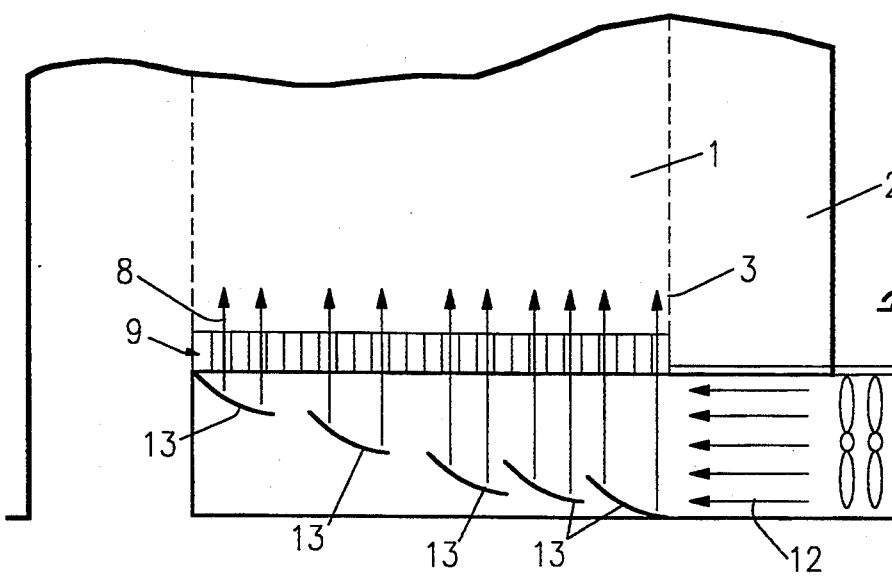
FIG. 3. One way to generate air flow pattern using air deflecting vanes.

Refer to FIG. 3. Air is ducted in horizontally from outside the flight space (12), and multiple air flow deflecting vanes (13), which are mounted staggered in place, at varying angles, resembling a cliff side, are used to change the direction of air flow from horizontal to flow upward.

Again refer to FIGS. 1 and 2. A part of the bottom of the flight space is made a flat surface (14). This flat surface is not covered by the protective netting and is also made free from the upward air flow. This flat surface is used as a landing area for landing the model aircrafts. In addition the transparent nylon netting all around the flight space, at a height accessible by people, has removable access panels (5). Through these removable access panels entrance to the interior of the flight space is made for either retrieving the model aircrafts or for launching them into the flight space.

The flight space has means to mark and delineate the space, without physically obstructing the flight space, for creating flight envelope or corridor of space or pylons for air races by a grid or columns of visible laser light beams. These beams are produced from laser light sources producing pencil light beams of any color, intensity, thickness etc. for this purpose (15). In addition laser light beam sensors are placed to sense the interruption of light beam from the laser light sources to generate an audible or visual alarm (16).

Figure 4:
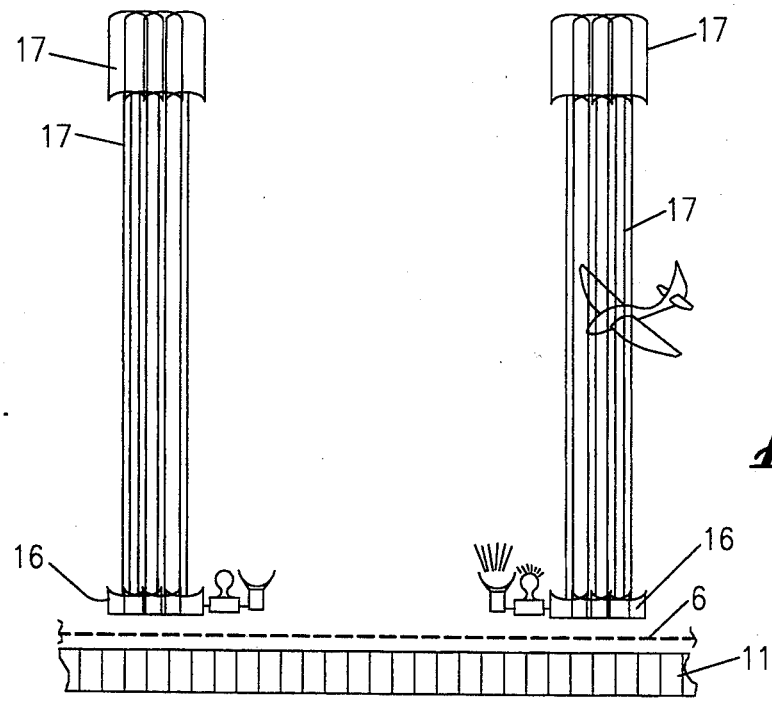
FIG. 4. Pylons made of Visible laser light beams inside the flight space.

Visible laser light sources placed in a tight cluster are used to create vertical columns of light pillars to create the effect of two or more pylons in space for flying air races around them (17). See FIG. 4.

Figure 5:
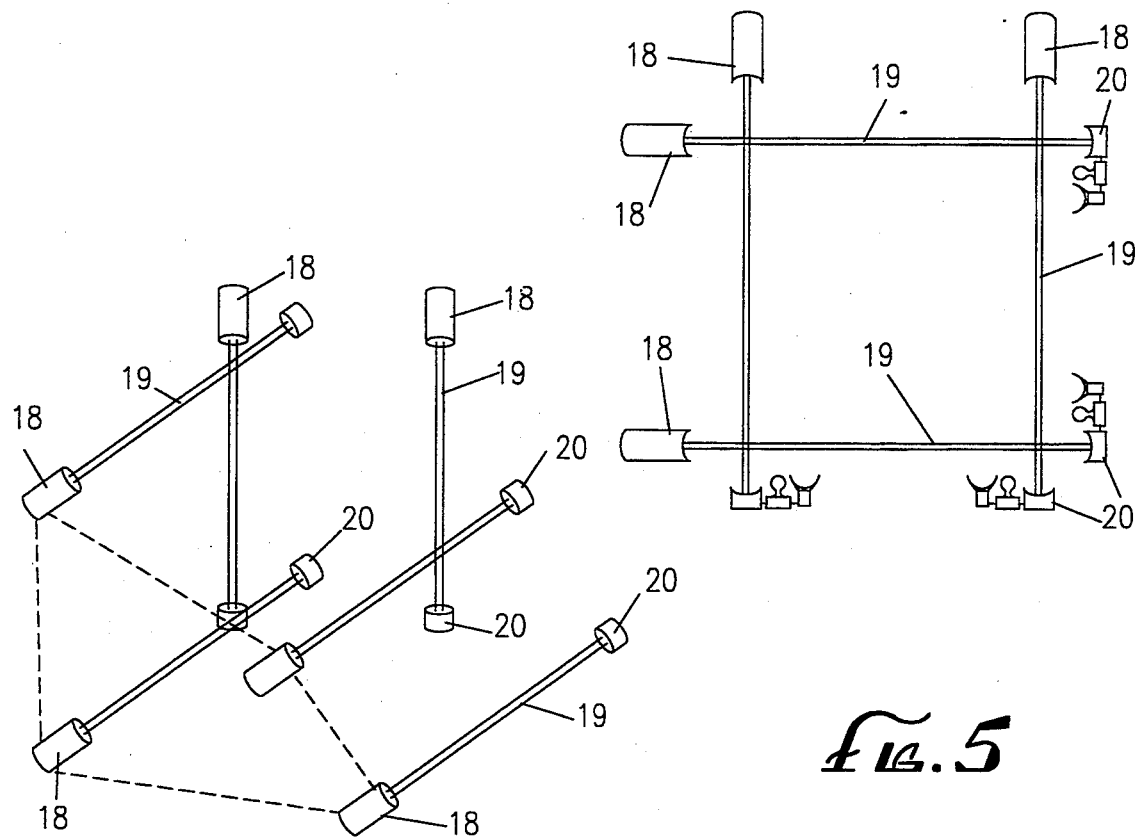
FIG. 5. Visible laser light beams marking and delineating areas and volumes of flight space.

Refer to FIG. 5. Visible laser light beams means are also used for dividing and delineating the flight space in subspaces which can be either in two or three dimension. A grid of visible laser light beam sources mounted in vertical planes and horizontal planes inside the flight space near the periphery of the flight space are used for this purpose (18). These sources produce light beams that cross each other at right angles or other angles marking areas or volumes of space (19). Some of the said laser light beams, those that are on the boundary of the subspaces, are intercepted by a photocell detecting means, mounted at the other end of interior of the said flight space (20). These photocells sense the interruption of the laser light beam and generating a visual and aural alarm indicating the interruption of the light beam by model aircraft straying in its flight path and crossing these beams.

The flight space prepared as described above is occupied by multiple small light weight radio controlled model aircrafts flown and controlled by individuals engaged in this activity and standing in the non-flight space (21).

The light weight and consequently small size model aircraft is achieved by reducing the weight of receiver and battery size due to shorter distance of radio transmission and which reduces power needs. Small light weight model aircraft for indoor flight have remote control transmitter and miniature receiver and micro servo motor means which control the flying surfaces of aircraft's flight in the interior of the flight space. The aircraft's receiver and said servo motor are powered by a rechargeable kind miniature electrical battery cell.

Therefore I claim:

1. A device useful for providing an enclosed environment for flight of remotely controlled model aircraft, the device comprising:
   (a) an enclosure substantially enclosing a flight space, wherein a substantial part of the enclosure is made of a transparent barrier allowing observation into the flight space;
   (b) an upward airflow in the enclosure generated by an airflow source located in close proximity to a bottom of the enclosure;
   (c) an adjustable mechanism for spreading the airflow from the airflow source into the flight space; and
   (d) the flight space having a plurality of light beams, whereby the light beams simulating physical obstacles;
   whereby the model aircraft, supported in flight by the upward airflow, fly around in the flight space and use light beams as obstacles to fly around.

2. The device of claim 1, wherein the airflow source placed outside the flight space, and the airflow conveyed into the flight space.

3. The device of claim 1, wherein the spreading means comprising a plurality of airflow deflecting vanes mounted in close proximity to the bottom of the enclosure and within the path of the airflow source.

4. The device of claim 1, wherein the light beams comprise a cluster of the light beams, thereby simulating the effect of a pylon in the flight space for the model aircraft to fly around.

5. The device of claim 1, comprising a mechanism to detect interruption of the light beams by the model aircraft and a mechanism to generate an alarm, whereby when the model aircraft flies into the light beam, the alarm will be generated.

6. The device of claim 1, wherein the light beams mark and delineate the flight space in dimensional subspaces, for the model aircraft to occupy.

7. The device of claim 1, wherein the flight space is occupied by at least one model aircraft.

8. The device of claim 1, wherein the flight space having illumination means.

9. The device of claim 1, wherein the flight space further comprising an area free of upward airflow and substantially flat to allow the model aircraft to land.

10. The device of claim 1, further comprising an enclosed structure substantially enclosing the flight space and having space for model aircraft operators and spectators.

11. A device to engage in indoor flight of radio controlled model aircrafts comprising:
   (a) an enclosed space having walls, a floor, a ceiling and entry and exit means;
   (b) said ceiling having ventilation means;
   (c) said enclosed space partitioned into a flight space and non-flight space;
   (d) said flight space surrounded by said non-flight space;

(e) said flight space enclosed on all sides by a transparent barrier;

(f) said transparent barrier attached to the ceiling and anchored to the floor;

(g) said transparent barrier having at least one removable access panel for access into the interior of the flight space;

(h) said flight space illuminated by light fixture means;

(i) said flight space having a bottom near the floor, a top near the ceiling and a middle between the floor and the ceiling;

(j) said bottom having an upward air flow source;

(k) said middle of the flight space having upward flowing air flow originating from the upward air flow source;

(l) said flight space having visible laser light beams;

(m) said laser light beams projecting laser light beams across the flight space, marking and dividing the flight space into three dimensional subspaces;

(n) said flight space being occupied by at least one radio controlled model aircraft in flight;

(o) said radio controlled model aircraft in the flight space being controlled by radio transmitted from the non-flight space; and (p) said transparent barrier permitting observation of said model aircraft from said non-flight space.

12. The device of claim 1, wherein the upward air flow source comprises:

(a) means for generating air flow;

(b) means for spreading and releasing the air flow in close proximity to the bottom of the flight space;

(c) means for ducting said air flow from the means for generating air flow to the means for spreading and releasing; and (d) ventilation means for ventilating the air flow at the top of the flight space.

13. The device of claim 12 wherein the means for spreading and releasing air flow comprises:

(a) a plurality of air flow deflecting vanes mounted inside the flight space in close proximity to the bottom of the flight space;

(b) wherein the mounting of said vanes is staggered at various heights above the bottom of the flight space to simulate a cliff surface;

(c) the air flow generating means releasing air flow horizontally, directed at the vanes; and (d) said air flow being deflected from the vanes in the vertical direction towards the top of the flight space.

14. The device of claim 11, wherein the flight space further comprises:

(a) an air flow free volume located in close proximity to the bottom of the flight space, the air flow free volume not having upward airflow; and (b) said air flow free volume having a flat surface and being sufficiently large to allow for landing of the model aircraft.

15. The device of claim 11:

(a) wherein the visible laser light beams project in a vertical plane across the flight space and beams project in a horizontal plane across the flight space; and (b) wherein each of the plurality of laser light beam sources have a corresponding photocell detector mounted opposite from each light beam source in the flight space, wherein the photocell is located in the path of the beam projected from each laser light beam source;

(c) wherein each photocell detector senses the interruption of each corresponding laser light beam and generates an alarm indicating the interruption of the light beams.

16. The device of claim 11, wherein:

(a) multiple clusters of said visible laser light beam sources are mounted in close proximity to the top of the flight space;

(b) said multiple clusters throwing multiple columns of parallel light beams directed vertically downward towards the bottom;

(c) said multiple light clusters spaced inside the flight space to resemble pylons in space for the purpose of air races in the said flight space.

17. The device of claim 16 wherein the:

(a) multiple clusters of visible laser light beam sources are mounted in close proximity to the sides of the flight space, each source projecting a horizontal beam across the flight space.

18. A device useful for providing a controlled environment for remotely controlled aircraft such as airplanes, the device comprising:

(a) a substantially enclosed flight space, wherein the flight space is sufficiently large to allow for controlled flight of a remotely controlled aircraft;

(b) means for creating upward air flow in the flight space, wherein the means for creating the upward air flow is sufficient to keep an aircraft airborne, the means for creating the upward air flow in the flight space comprises air flow spreading means located in close proximity to a bottom of the flight space for distributing and controlling air flow in the flight space and ducting means for transferring the air in fluid communication from the means for generating air flow to the spreading means;

wherein the spreading means comprises a plurality of air flow deflecting vanes mounted in close proximity to the bottom of the flight space and within the path of the air flow from the means for generating air flow, the deflecting vanes being capable of being adjusted to deflect and adjust the upward air flow in the flight space; and (c) means to mark the delineate the flight space without physically obstructing the flight space for air races.

19. The device of claim 18 further comprising light fixture means wherein the light fixture means are sufficiently intense to illuminate the inside of the flight space.

20. The device of claim 18 wherein the flight space has vertical sides and an opposed top and bottom.

21. The device of claim 20 wherein at least a portion of one side of the flight space is made of a transparent barrier which allows for observation into the flight space.

22. The device of claim 20 wherein at least one side of the flight space is made of a transparent barrier which allows for observation into the flight space.

23. The device of claim 20 wherein at least one side of the flight space further comprises at least one removable access panel, which may be removed to permit access into the flight space.

24. The device of claim 18 wherein at least one remotely controlled aircraft is placed inside the flight space, the aircraft having control surfaces for adjusting the flight of the aircraft.

25. The device of claim 18 wherein the means to mark and delineate the flight space is at least one visible laser light beam source which projects a beam which intersects the flight space.

26. The device of claim 18 wherein the means to mark and delineate the flight space is a plurality of visible laser light beam sources which are placed in a tight cluster to form columns of light beams, with each laser light beam source projecting a beam which intersects the flight space, wherein each cluster of light beams creates the effect of a pylon in space.

27. The device of claim 26 further comprising a plurality of detection means, each detection means being located opposite from each visible laser light source and in the path of the projecting beam from the laser light source, the detection means being capable of detecting an interruption in the laser light beam.

28. The device of claim 18 wherein the flight space further comprises an air flow free area, the air flow free area having a substantially flat surface and reduced upward airflow, the air flow free area being sufficiently large to allow for landing an aircraft.

29. The device of claim 18 further comprising an enclosed space which totally encloses the flight space and allows for indoor viewing of the aircrafts, the enclosed space being sufficiently large to totally enclose the flight space while allowing space for aircraft operators and spectators.

* * * * *